UNITED STATES PATENT OFFICE.

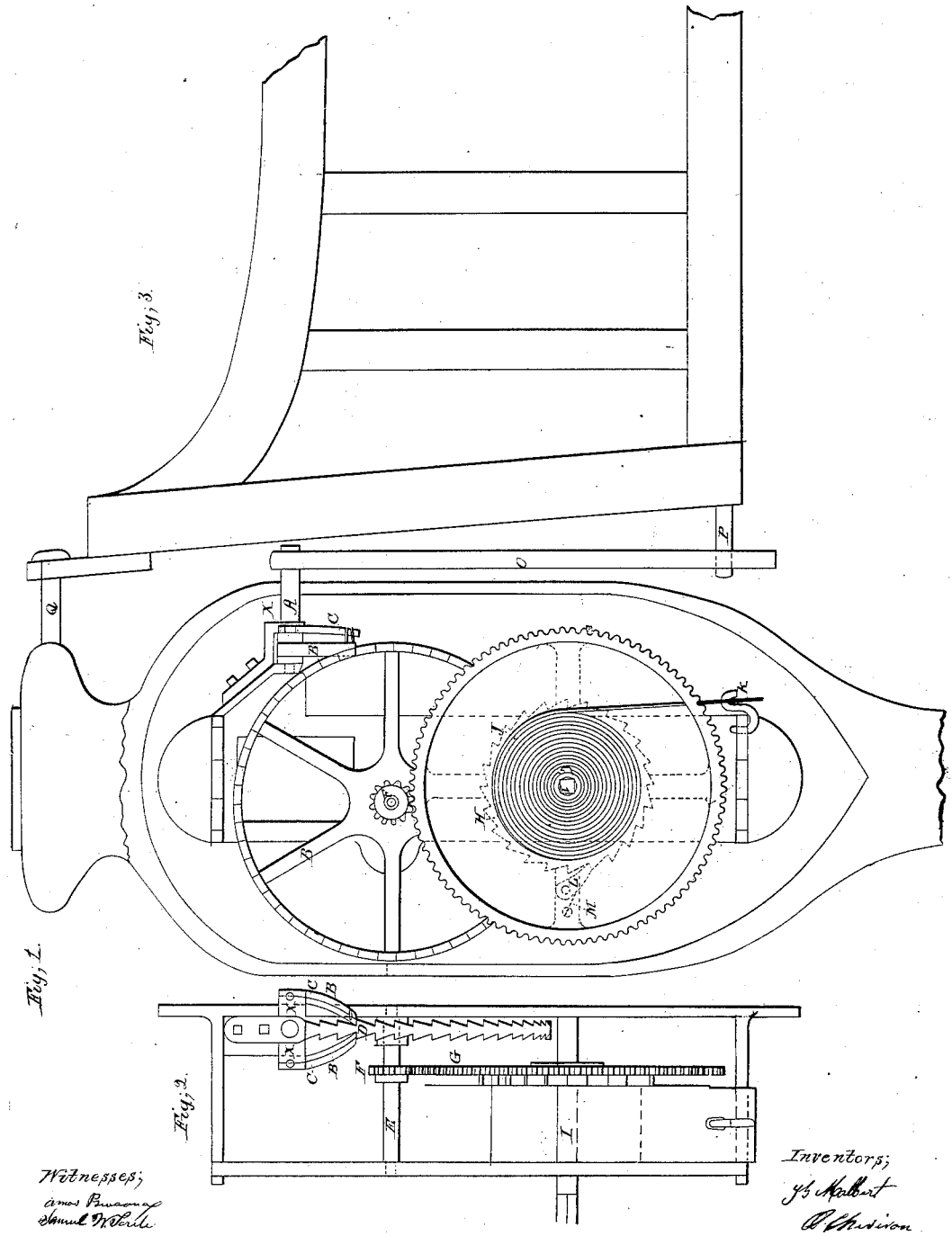

JEAN B. MALBERT AND AUGUSTI CHEVIRON, OF ST. LOUIS, MISSOURI.

SPRING ROCKING CRADLE.

Specification of Letters Patent No. 20,284, dated May 18, 1858.

*To all whom it may concern:*

Be it known that we, JEAN BAPTISTE MALBERT and AUGUSTI CHEVIRON, of the city of St. Louis and State of Missouri, have invented a new and useful Machine for Rocking Cradles; and we do hereby declare that the following is a full, clear, and exact description of the same, reference being had to the annexed drawings, making a part of this specification, in which—

Figure 1 is a front elevation, showing the machine as attached to the cradle, Fig. 2 is a side elevation, and Fig. 3 is a part of the cradle, sufficient to show the mode of operation.

This machine consists of a combination of springs, cog, and ratchet wheels, which are secured in a frame, and placed inside of one of the columns, which constitutes a part of the frame of the cradle. The machine is connected to the cradle by means of the small shaft and lever, shown at A O, Fig. 1. The cradle is swung on pivot, in the columns, as shown at Q.

That the nature of this machine may be clearly understood, we will proceed to describe its operation.

A key is applied to the end of the shaft I, to which is attached the spring J, and the ratchet wheel H, shown in dotted lines Fig. 1; the spring J is secured on a hook at K. Upon turning the key at I, so as to wind up the spring J, the ratchet wheel H has a tendency to turn; equal to the force exerted by the spring. The ratchet wheel H is kept in position by the pawl L, which is kept in its position, by the spring M, shown also in dotted lines Fig. 1. The cog wheel G is made to revolve freely on the hub of the ratchet wheel H. The wheel G is attached to the wheel H by the pawl I which conveys the power of the spring J, through the wheels to the cradle. The pinion F in which the wheel G acts, is secured to the shaft E, to which also is attached the double scape wheel D. This last named wheel, is acted upon by two scapements B B, which are suspended to each end of the small beam X, and this beam is secured to the shaft A so as to vibrate with it. The scapements B B vibrate freely on their centers, which are made stationary in the beams and have the springs C C secured at one end in them, the other end being secured to the pawl, with a small staple. These springs making the pawl B B, scapements so that at each vibration of the shaft A, the springs C C shall tend to throw them back from the wheel D.

The lever O is attached to the shaft A and when made to vibrate throws one of the scapements back from the wheel D. The spring J is then exerting its whole force against the end of the other scapement, which causes the beam X to act as a lever, so as to bring the lever O back, and in doing so brings the detached scapement back to the wheel D, in time to catch it, after it has traveled a distance equal to one of the notches on it, so that, so long as the spring J has power to vibrate the lever, the lever will rock the cradle, because of its attachment at P. The spring will continue to act, until run down, or is unwound, as the spring of a clock. The pawl N prevents the wheel G from turning back.

We do not claim broadly, the application of machinery to the column or frame of the cradle, neither do we claim the double escapement (which consists of the beams X X—the pallets B B and the springs C C) as such, but

What we claim is—

The arrangement of this double escapement with the escape wheel D in the manner described, the wheel being operated by the described combination of wheels and springs in the manner set forth.

JEAN B. MALBERT.
A. CHEVIRON.

Witnesses:
ARTHUR LATHAM,
CLARENCE DELAFIELD.